United States Patent
Maloney

(10) Patent No.: US 7,049,961 B2
(45) Date of Patent: May 23, 2006

(54) KEY CONTROL SYSTEM USING SEPARATED ID AND LOCATION DETECTION MECHANISMS

(75) Inventor: William C. Maloney, Atlanta, GA (US)

(73) Assignee: Key Control Holding, Inc., Houston, TX (US)

( * ) Notice: Subject to any disclaimer, the term of this patent is extended or adjusted under 35 U.S.C. 154(b) by 0 days.

(21) Appl. No.: 10/924,330

(22) Filed: Aug. 23, 2004

(65) Prior Publication Data

US 2005/0024211 A1  Feb. 3, 2005

Related U.S. Application Data

(63) Continuation of application No. 10/133,130, filed on Apr. 26, 2002, now Pat. No. 6,812,838.

(60) Provisional application No. 60/286,760, filed on Apr. 26, 2001.

(51) Int. Cl.
*G08B 13/14* (2006.01)

(52) U.S. Cl. .............................. 340/568.1; 340/568.7; 340/572.1

(58) Field of Classification Search ................ 340/551, 340/568.1, 568.7, 572.1, 572.2, 572.4, 572.7, 340/572.8, 572.9, 10.3; 700/225, 233; 705/23, 705/28

See application file for complete search history.

(56) References Cited

U.S. PATENT DOCUMENTS

| | | | |
|---|---|---|---|
| 527,589 A | 10/1894 | Bristol | 312/212 |
| 2,971,806 A | 2/1961 | Andreasen | 312/223 |
| 3,648,241 A | 3/1972 | Naito et al. | 340/5.5 |
| 4,060,795 A | 11/1977 | Harumiya et al. | 340/518 |
| 4,267,942 A | 5/1981 | Wick, Jr. et al. | 221/2 |
| 4,519,522 A | 5/1985 | McElwee | 221/13 |
| 4,527,578 A | 7/1985 | Klein et al. | 134/57 R |
| 4,549,170 A | 10/1985 | Serres et al. | 340/568 |

(Continued)

FOREIGN PATENT DOCUMENTS

GB  1364535  8/1974

(Continued)

OTHER PUBLICATIONS

Memory-Based identifier Tag Provides Digital ID- Dave IBursky—Electronic Design—Jul. 25, 1992—pp. 153-156.

(Continued)

*Primary Examiner*—Van T. Trieu
(74) *Attorney, Agent, or Firm*—Jackson Walker L.L.P.; Mark A. Tidwell, Esq.

(57) ABSTRACT

An object control and tracking system and related methods using separate object identification and location detection mechanisms for objects, such as keys, that are maintained in a secure enclosure, such as a key drawer. A plurality of object slots are located on the top tray of the enclosure to receive object tags that include both an RFID tag and an object to be tracked. The objects (e.g., keys) are attached to a portion of the object tags that are outside of the enclosure. Presence detectors are used to determine if an object tag is present in the corresponding slot of the enclosure. RFID sensors located on opposite interior side walls of the enclosure interrogate each RFID tag to determine the presence of each RFID tag within the enclosure. The object control and tracking system includes a controller, a memory for storing an object control database, and related processing logic operating on the controller to control scanning of the presence detectors to determine an object tag's presence in a corresponding slot, to identify each object present in the enclosure and to compare the identified objects with an object control database to determine each object removed or replaced since the previous database update.

40 Claims, 11 Drawing Sheets

U.S. PATENT DOCUMENTS

| | | | | |
|---|---|---|---|---|
| 4,575,719 A | 3/1986 | Bertagna et al. | ....... | 340/825.35 |
| 4,595,922 A | 6/1986 | Cobb et al. | ........... | 340/825.49 |
| 4,635,053 A | 1/1987 | Banks et al. | ........... | 340/825.31 |
| 4,636,634 A | 1/1987 | Harper et al. | ........... | 250/223 R |
| 4,636,950 A | 1/1987 | Caswell et al. | ............... | 705/28 |
| 4,661,806 A | 4/1987 | Peters et al. | ............. | 340/568.1 |
| 4,663,621 A | 5/1987 | Field et al. | ................... | 340/5.3 |
| 4,673,915 A | 6/1987 | Cobb | ........................ | 340/330 |
| 4,783,655 A | 11/1988 | Cobb et al. | ............ | 340/825.49 |
| 4,812,985 A | 3/1989 | Hambrick et al. | .......... | 700/215 |
| 4,814,592 A | 3/1989 | Bradt et al. | ................. | 235/381 |
| 4,839,875 A | 6/1989 | Kurlyama et al. | ............ | 369/14 |
| 4,845,492 A | 7/1989 | Cobb et al. | ............ | 340/825.49 |
| 4,885,571 A | 12/1989 | Pauley et al. | ............ | 340/573.4 |
| 4,896,024 A | 1/1990 | Morello et al. | ............. | 235/381 |
| 4,918,432 A | 4/1990 | Pauley et al. | ............ | 340/573.4 |
| 4,929,819 A | 5/1990 | Collins, Jr. | ................. | 235/383 |
| 4,967,906 A | 11/1990 | Morello et al. | .......... | 206/387.1 |
| 5,038,023 A | 8/1991 | Saliga | ....................... | 235/385 |
| 5,172,829 A | 12/1992 | Dellicker, Jr. | ................. | 221/13 |
| 5,287,414 A | 2/1994 | Foster | ........................... | 382/1 |
| 5,404,384 A | 4/1995 | Colburn et al. | ................ | 377/6 |
| 5,426,284 A | 6/1995 | Doyle | ........................ | 235/385 |
| 5,434,775 A | 7/1995 | Sims et al. | .................... | 700/8 |
| 5,533,079 A | 7/1996 | Colburn et al. | ................ | 377/6 |
| 5,671,362 A | 9/1997 | Cowe et al. | .................. | 395/228 |
| 5,689,238 A | 11/1997 | Cannon, Jr. et al. | ..... | 340/572.1 |
| 5,703,785 A | 12/1997 | Bluemel et al. | ............ | 700/244 |
| 5,721,531 A | 2/1998 | Garver et al. | .......... | 340/825.49 |
| 5,739,765 A | 4/1998 | Stanfield et al. | ........ | 340/825.49 |
| 5,771,003 A | 6/1998 | Seymour | ................... | 340/572.1 |
| 5,777,884 A | 7/1998 | Belka et al. | ................. | 700/225 |
| 5,794,213 A * | 8/1998 | Markman | .................... | 705/23 |
| 5,801,628 A | 9/1998 | Maloney | .................. | 340/568.2 |
| 5,836,002 A | 11/1998 | Morstein et al. | ......... | 340/568.1 |
| 5,905,653 A | 5/1999 | Higham et al. | ............. | 700/244 |
| 5,936,527 A | 8/1999 | Isaacman et al. | ........ | 340/572.1 |
| 5,957,372 A | 9/1999 | Dean et al. | ................. | 232/43.1 |
| 5,961,036 A | 10/1999 | Michael et al. | ............ | 232/43.1 |
| 5,963,134 A | 10/1999 | Bowers et al. | ............ | 340/572.1 |
| 5,971,593 A | 10/1999 | McGrady | ..................... | 700/233 |
| RE36,530 E * | 1/2000 | Heller et al. | ................... | 398/40 |
| 6,069,563 A | 5/2000 | Kadner et al. | ............... | 340/571 |
| 6,073,834 A | 6/2000 | Michael et al. | ............ | 232/43.1 |
| 6,075,441 A | 6/2000 | Maloney | .................. | 340/568.1 |
| 6,127,928 A * | 10/2000 | Issacman et al. | ........ | 340/572.1 |
| 6,148,271 A | 11/2000 | Marinelli | ..................... | 702/241 |
| 6,195,005 B1 | 2/2001 | Maloney | .................. | 340/568.1 |
| 6,204,764 B1 | 3/2001 | Maloney | .................. | 340/568.1 |
| 6,232,876 B1 | 5/2001 | Maloney | .................. | 340/568.1 |
| 6,693,539 B1 * | 2/2004 | Bowers et al. | ............ | 340/572.1 |
| 6,707,381 B1 | 3/2004 | Maloney | .................. | 340/568.1 |
| 6,714,121 B1 * | 3/2004 | Moore | ........................ | 340/10.3 |
| 6,745,366 B1 | 6/2004 | Roh et al. | ................... | 714/805 |
| 6,788,997 B1 | 9/2004 | Frederick | ..................... | 700/236 |

FOREIGN PATENT DOCUMENTS

| | | |
|---|---|---|
| WO | WO 95/04324 | 2/1995 |
| WO | WO 95/12858 | 5/1995 |
| WO | WO 00/16280 | 3/2000 |
| WO | WO 00/16281 | 3/2000 |
| WO | WO 00/16282 | 3/2000 |
| WO | WO 00/16284 | 3/2000 |
| WO | WO 00/16564 | 3/2000 |
| WO | WO 01/75811 | 10/2001 |

OTHER PUBLICATIONS

Dallas Registered—50 Ways to Touch Memory Third Edition—1994 Dallas Semiconductor Corporation—Third Edition, Aug. 1994.

* cited by examiner

KEY CONTROL SYSTEM USING SEPARATED ID AND LOCATION DETECTION MECHANISMS

CROSS-REFERENCE TO RELATED APPLICATION

The present patent application is a continuation of U.S. patent application Ser. No. 10/133,130, filed Apr. 26, 2002 now U.S. Pat. No. 6,812,838; which application is a formalization of a previously filed, co-pending provisional patent application entitled "Key Control System that Uses Separated ID and Location Detection Mechanisms," filed Apr. 26, 2001, as U.S. patent application Ser. No. 60/286,760 by the inventor named in this patent application and claims the benefit of the filing date of the cited provisional patent application, according to the statutes and rules governing provisional patent applications, particularly 35 USC § 119(e)(1) and 37 CFR §§ 1.789(a)(4) and (a)(5). The specification and drawings of the provisional patent application are specifically incorporated herein by reference.

BACKGROUND OF THE INVENTION

The present invention is generally related to controlling and tracking access to various types of objects. More particularly, the present invention relates to an object control system for continuous inventory of a plurality of objects.

Systems have been developed in which a user swipes an optical bar code on a key tag before placing the key tag in a slot or on a peg of a storage unit. A switch associated with the slots or pegs of the storage unit detects that a tag has been placed in a specific slot, or on a specific peg. In these systems, a connected controller assumes, but does not know with certainty, that the user has placed the swiped tag in the slot or on the peg. The shortcoming of this system, of course, is that the identification of the tag placed in a slot, or on a peg, is dependent upon the integrity of the user. A user can, for example, swipe one tag and place another tag in the slot or on the peg and the controller has no way of knowing of the deception or error. Thus, the system is not completely secure.

Other systems have been developed in which the identification of tags present in a receptacle is determined by communicating with the tags in the receptacle via infrared signals. In these systems, the controller knows that a tag is in the receptacle but cannot know the particular slot of the receptacle occupied by the tag. Light emitting diodes (LEDs) are provided on each tag to identify a requested tag visually to a user requesting the key associated with the tag, such that the particular slot associated with each tag is not deemed to be critical. The shortcomings of such a system include the fact that the system can not identify the specific location of each tag within the receptacle. Similar systems have been developed wherein each tag includes an addressable switch, and an LED on the tag lights when the ID code of the particular tag within the receptacle is transmitted by the controller. In these systems, as well, the controller can never identify the specific location of a tag within the receptacle.

The inventor's previous object tracking patents, U.S. Pat. Nos. 5,801,628 and 6,075,441, used one-wire memory buttons on key tags as a preferred embodiment. The presence of a key tag in a key tag slot was determined by selectively polling each slot location using a matrix selector. In addition to determining the presence of a key tag, the one-wire memory buttons have unique identification (ID) codes that allow the key control system to identify which key tag is inserted in each slot. The inventor's prior RF key control system patent, U.S. Pat. No. 6,204,764 used radio frequency identification (RFID) tags on key tags. At each tag slot, an RFID sensor antenna was placed to communicate, and again, a matrix selector approach was used to poll each slot. Because the RFID tags contain unique ID codes, this system also determines presence and identification in the same process.

Although these object tracking systems are sophisticated and provide a continual inventory of a plurality of objects, separation of the identification function and the location/detection function can result in novel key control systems. These novel systems offer the potential to be technically simpler and thus available at lower costs.

SUMMARY OF THE INVENTION

The present invention separates the object identification function and the object location detection function in a key control system. More generally, the present invention provides an object control and tracking system and related methods that use separate object identification and location detection mechanisms for objects, that are maintained in a secure enclosure. A plurality of object slots that are "electrically small" in comparison to the wavelength of the RFID sensors are located on the top tray of the enclosure to receive object tags that include both an RFID tag and an object to be tracked. The objects are attached to a portion of the object tags that are outside of the enclosure. Presence detectors positioned on the backplane of the enclosure are used to determine if an object tag is present in the corresponding slot of the enclosure. RFID sensors located on opposite interior side walls of the enclosure interrogate each RFID tag to determine the presence of each RFID tag within the enclosure. Each RFID tag includes an anti-collision protocol to enable a plurality of RFID tags within the sensor field to be interrogated. In one embodiment, the RFID sensors include a pair of sensor coils and the RFID tags are inductive. The pair of sensor coils generate a magnetic field between the side walls of the enclosure, the magnetic field being normal to the vertical surface of each object tag. In another embodiment, the RFID sensors include capacitive plates, and the RFID tags are capacitive. The object control enclosure is constructed of metal and is shielded to prevent detection of object tags that are located externally to the enclosure and that could be contained in a separate object control enclosure.

The object control and tracking system includes a processor, a memory for storing an object control database, and related processing logic operating on the processor to control scanning of the presence detectors to determine if an object tag is present in a corresponding slot, to identify each object (via its unique RFID tag) present in the enclosure and to compare the identified objects with an object control database to determine each object removed or replaced since the previous database update.

Various types of switches mounted on the backplane are suitable for use as object tag presence detectors. These include a contact switch having a lever that is engaged to close the contact switch when an object tag is inserted into a corresponding slot. Another suitable switch includes a photo-conducting switch mounted to the backplane on a side of a corresponding slot with a light emitting diode mounted on the opposite side, such that insertion of the object tag into the slot causes an electrical circuit to open to indicate the presence of an object tag. The object tag can also include a metallic end portion or an embedded magnetic material that causes an electrical circuit to close when either an object tag is inserted into the corresponding slot and is detected by engaging a pair of contacts in the slot or when a reed switch is energized by proximity of the object tag.

In one embodiment, each object tag includes a light emitting diode circuit, an RFID addressable switch and an RFID tag coil. An RFID addressable switch enables an RFID interrogating field to selectively activate a light emitting diode on the object tag corresponding to the object a user is trying to identify in order to remove the object from the enclosure.

DESCRIPTION OF THE DRAWINGS

The invention is better understood by reading the following detailed description of the exemplary embodiments in conjunction with the accompanying drawings.

DETAILED DESCRIPTION OF THE INVENTION

The separation of the identification and location detection functions of the present invention is described herein in the context of a system that utilizes RFID tags. It is possible using the concepts of the present invention to construct equivalent systems using one-wire memory devices and/or other memory devices.

Figure 1:
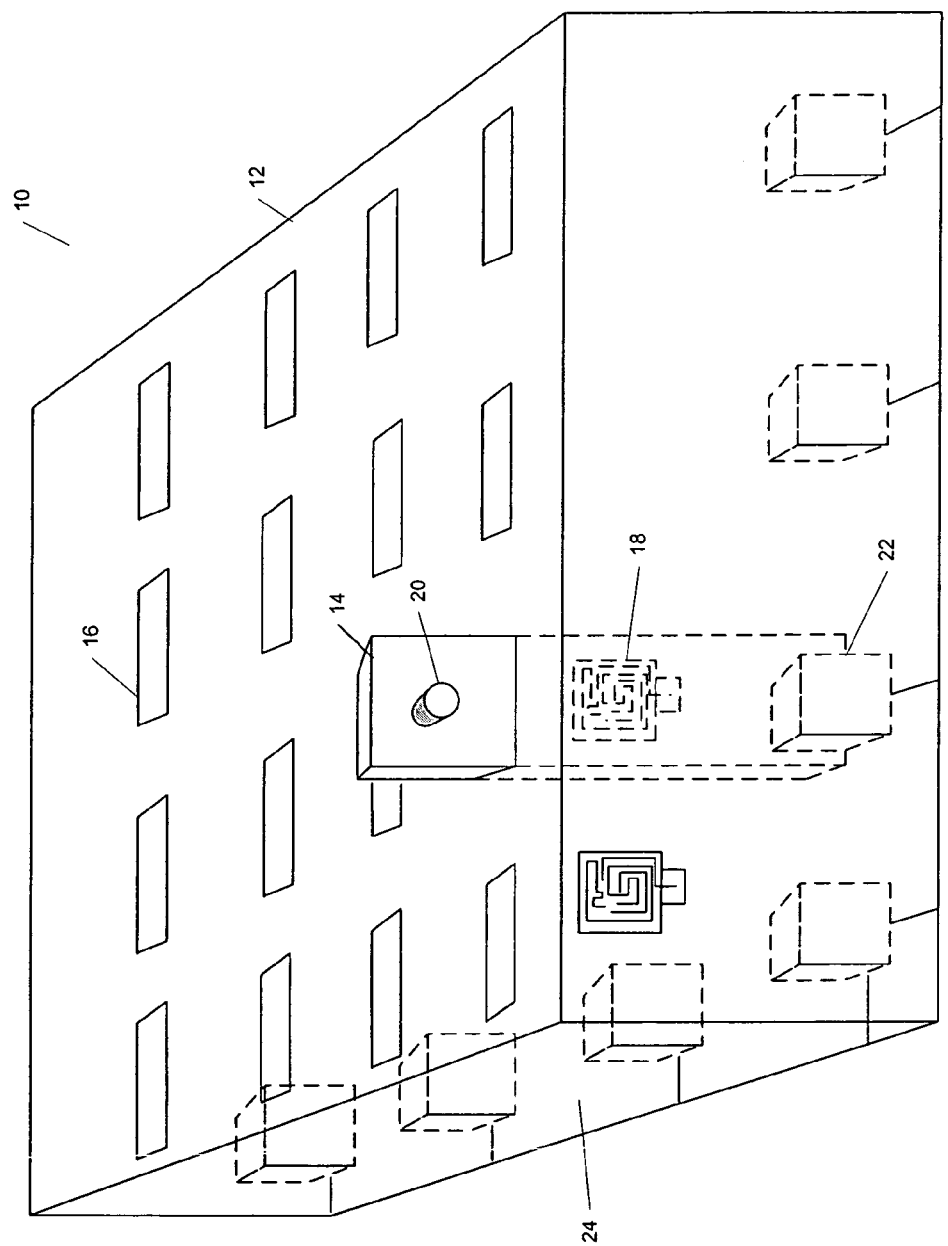
FIG. 1 illustrates an exemplary embodiment of a key control assembly in which the identification and location detection system mechanisms are separated.
Figure 9:
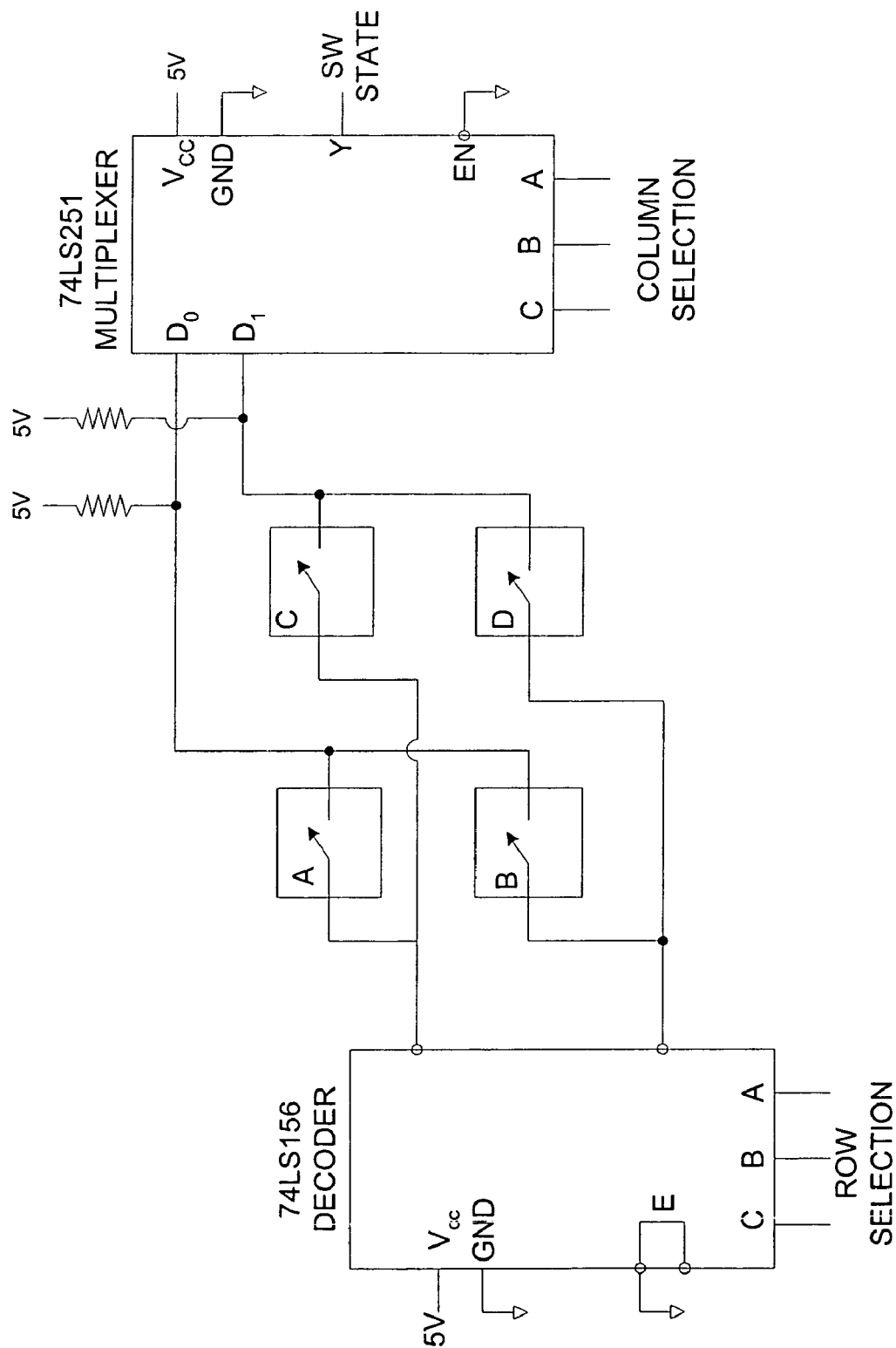
FIG. 9 illustrates the concept of encoding switches into a matrix in accordance with an exemplary embodiment of the present invention.

A representation of a key control assembly having separated identification and location detection functions is illustrated in FIG. 1. The key control assembly 10 is a portion of a key control system. The key control assembly 10 includes a key control enclosure 12. The key tags 14 are inserted through narrow key-tag slots 16 in the top tray 15 of the enclosure 12. The portion of the key tag 14 that is inside the enclosure contains an RFID tag 18. The keys are attached, via key attachment 20, to the portion of the key tags that are outside the key control enclosure 12. Presence detectors 22 are placed on a backplane 24 on the bottom of the enclosure 12. Corresponding to each presence detector 22 is a row selection line 23 and a column selection line 25. The presence detectors 22 are connected in a configuration similar to that found in a keyboard switch matrix. Each presence detector 22 has its own associated row selection line and column selection line. FIG. 9 shows a simplified circuit of a 2×2 switch matrix. The presence or absence of a key tag at each slot is thus determined.

Global RFID sensor coils are placed inside the enclosure near the right and left walls. The locations of RFID sensor coil A and RFID sensor coil B are indicated by reference numerals 27, 29 in FIG. 1. This pair of coils is used to interrogate and identify any RFID tags 18 that are present inside the enclosure 12. This represents the preferred embodiment of the invention. Alternative embodiments using a single coil or multiple sets of coils are also possible.

The key control system knows which slots 16 are occupied from the presence detectors 22, and knows which key tags 14 are inserted into the system from the RFID sensors. For some applications this may be sufficient. However, other applications require knowledge of which key tag 14 is inserted into which slot 16. This knowledge can be determined during operation as described in the flow chart illustrated in FIG. 2.

Figure 2:
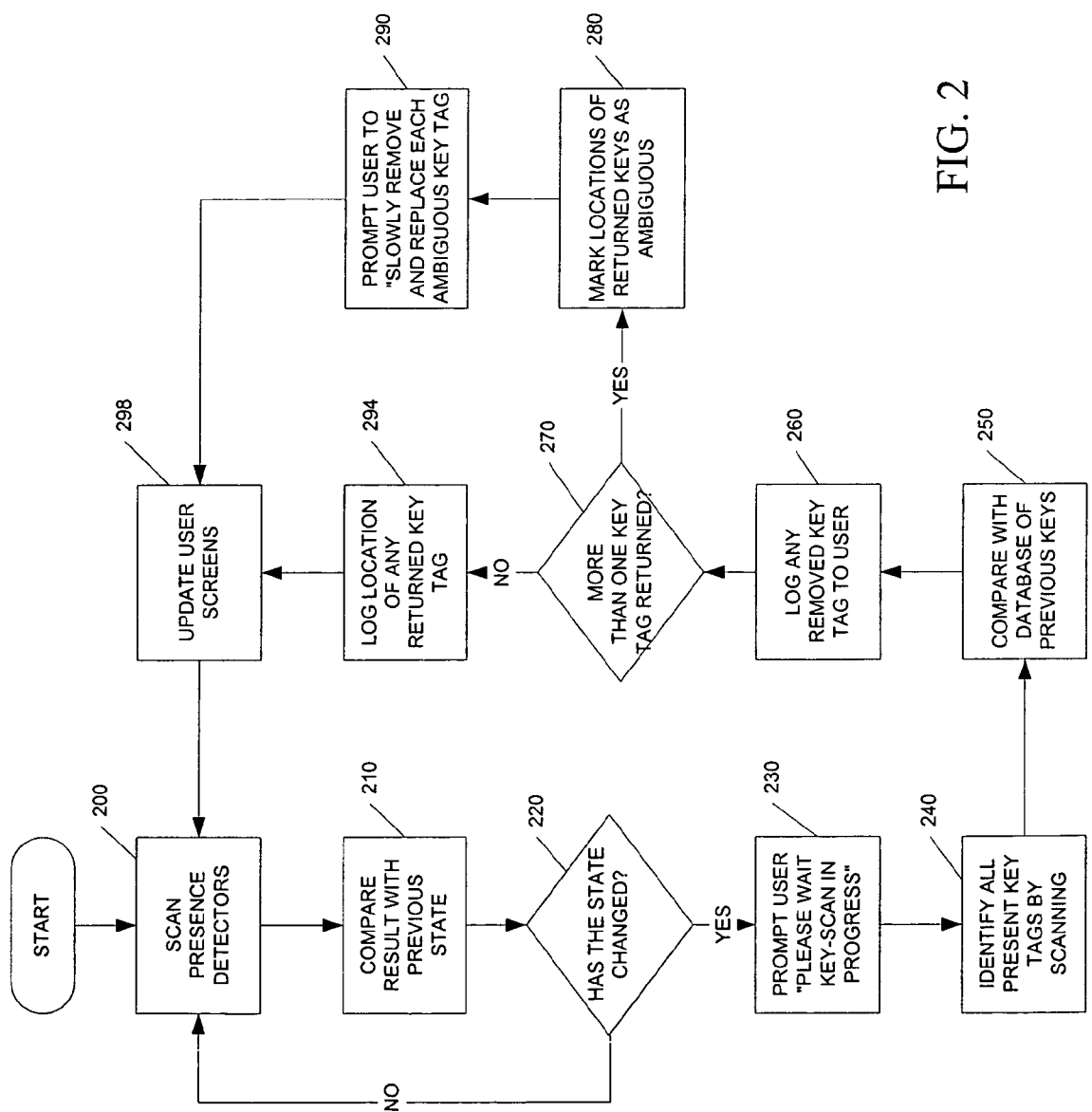
FIG. 2 illustrates the processing logic for accessing a key drawer in accordance with an exemplary embodiment of the present invention.

A user must first successfully log into the key control system before being granted access to the tag inventory. The key control system includes a controller (e.g., microcontroller, personal computer), a memory device, a display and other components. The procedure illustrated in FIG. 2 is executed by the programmed controller when the key drawer is being accessed. Scanning the matrix of presence detectors 22 starts the process as indicated in logic block 200. This is a very rapid process because each presence detector 22 is functionally just a switch that is either opened or closed. Most likely, the scanning of the presence detectors 22 is so fast that only a single key tag 14 will be removed or replaced before the key control system has a chance to respond. The result of the scan is compared with the known drawer status as indicated in logic block 210. In decision block 220, a test is made to determine if the state has changed. If the state has changed, then the user is prompted to wait while the key tag scan is in progress, as indicated by logic block 230. The key tag scan may take up to a few seconds to complete. While the key tag scan is in progress, the monitoring of the presence detectors 22 continues. If any additional key tag changes are detected, the key tag scan will be restarted.

The key tag scan is performed using the RFID tag sensor. RFID tags have anti-collision protocols that allow multiple tags within a sensor field to be interrogated. The RFID sensor scan determines the unique identification of any inserted key tags. These unique identification codes are utilized with a database of known key tag codes to determine which key tags 14 are currently inserted into the key control system as indicated in logic block 240.

After performing the key tag scan, the result is compared with the database to determine whether any key tags 14 have been removed or returned. This comparison step is indicated in logic block 250. Several possible scenarios exist including those described herein. The user may have removed one or more key tags 14; the user may have replaced one key tag 14; the user may have replaced multiple key tags 14; or the user may have removed and replaced one or more keys. These four scenarios are described in order below.

If the user has removed one or more key tags 14, then the key control system knows which key tags 14 have been removed from the RFID tag sensor scan. These keys are marked as checked out to the user as indicated in logic block 260. The user screens are updated to show the relevant key slots 16 as empty and the keys as checked out to the user. The system then reenters the scanning presence detector loop (logic block 200).

If the user has replaced one key (no-branch path from decision block 270), then the key control system will know which key tag 14 has been returned from the RFID sensor scan. The key control system will also know which key tag slot 16 the key tag 14 was placed in because only one new slot should be occupied. The key tag 14 is marked as returned, and the database is updated to reflect the key (i.e., key tag) now being located in the new slot. This is indicated in logic block 294. Finally, the user screens are updated to show the updated key tag inventory as indicated in logic block 298. The key control system reenters the scanning presence detector loop in logic block 200.

If the user has replaced more than one key tag (yes-branch path from decision block 270), then the key control system knows which key tags 14 have been returned from the RFID sensor scan, although it will not be able to unambiguously know which slot 16 the individual key tags 14 were returned to. The key control system will register the key tags 14 as returned and mark their locations as ambiguous, as indicated in logic block 280. The key control system then prompts the user to slowly remove and replace each ambiguous key tag, as indicated in logic block 290. The key control system knows which slots contain ambiguous key tags, but does not know which key tag 14 is inserted into each slot 16. The user screens are updated in logic block 298 and the key control system reenters the scanning presence detector loop in logic block 200.

If the user now follows the directions received via user prompts to remove and replace each ambiguous key tag, the key control system will be able to correctly update its location database. However, no real harm from a security standpoint is caused if the user ignores the request to remove and replace each ambiguous key tag. If a subsequent user requests an ambiguous key tag, the key control system will know that the key tag 14 can only be in a small number of key slots 16. As these key tags 14 are removed and replaced by subsequent users, the ambiguity will attenuate. For example, if the first user returns three key tags (e.g., A, B, and C) simultaneously, then all three keys are marked ambiguous and each key is given all three locations (e.g., X, Y, and Z). When a subsequent user requests key tag A, the system will notify the user that it might be in key slots X, Y, or Z. Consider that if this subsequent user pulls a key tag in slot X, the key control system will then perform the RFID key tag scan and can then tell the user which key tag 14 he removed. If it is the wrong key (e.g., B), the user can reinsert the key and try one of the other two locations. Notice that the key control system will now know the correct location for key tag B and the possible locations for key tags A and C are reduced to Y or Z. If the user then selects the key tag in slot Y, the system will perform another RFID key tag scan and can then tell the user if he has removed the desired key tag. Either way, all the ambiguity created by the first user has been removed by this point.

Figure 3:
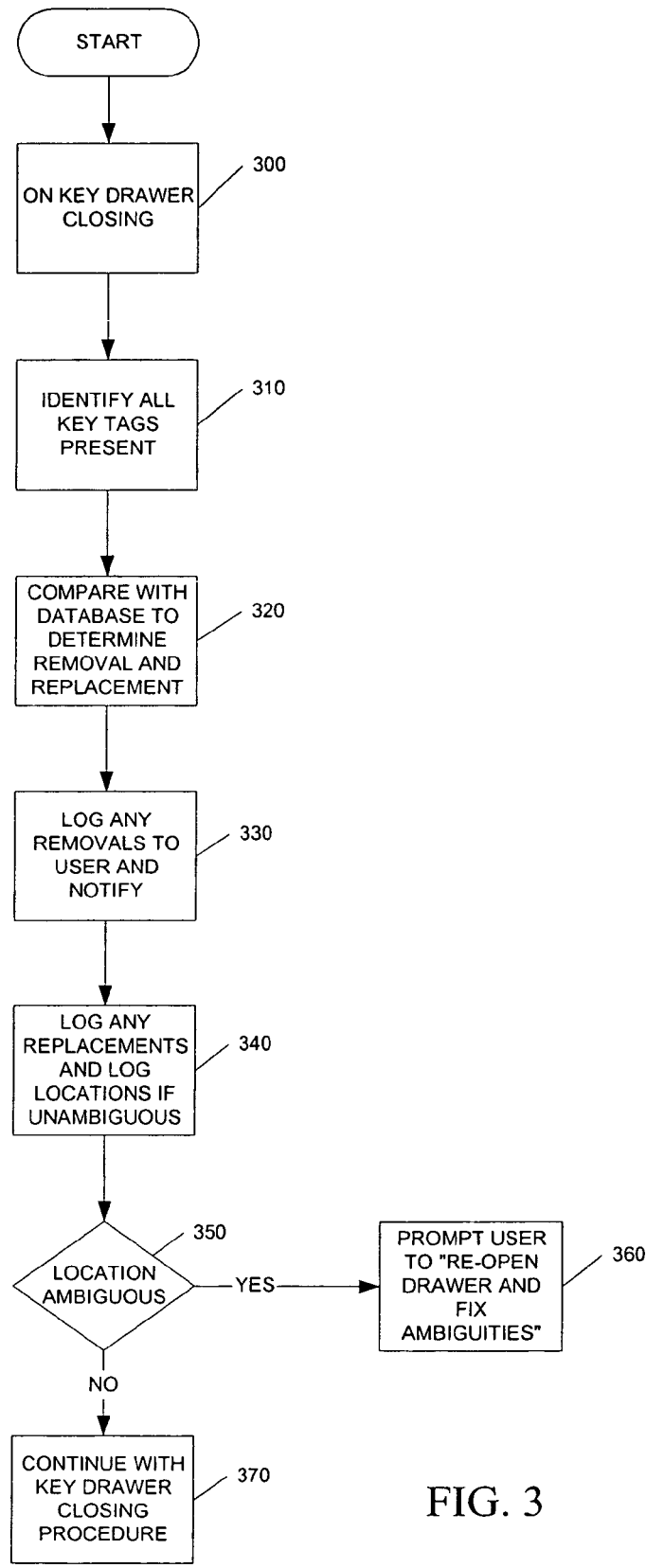
FIG. 3 illustrates the processing logic associated with the closing of a key control drawer in accordance with an exemplary embodiment of the present invention.

The final scenario to be described occurs if the user has removed and replaced key tags 14 before the system can respond. On first inspection, one might conclude that a user could fool the system by quickly removing one key tag 14 and inserting another into its slot 16 before the system can notice the removal. The speed of the presence detector scan should be fast enough to prevent this, but a secure system should not simply rely on speed. The closing of the key control drawer initiates the logic processing depicted in the flow chart of FIG. 3.

When the drawer is closed (logic block 300), an RFID key tag scan is performed to inventory all the key tags 14 in the drawer, as indicated in logic block 310. The key tags 14 present are compared with the database to determine removals and replacements, as indicated in logic block 320. Any discrepancies will be caught by the key control system at this time. Any unrecorded key returns will be logged in and their locations marked as ambiguous, as indicated in logic block 340. Any unrecorded key removals will be checked out to the user, as indicated in logic block 330. If an ambiguity exists, as determined in decision block 350, the user is notified of this ambiguity and given the opportunity to reopen the drawer and correct any mistakes as indicated in logic block 360. It is not possible for the user to get away with the removal of a key tag 14 in a key control system without logging it out. The worse that could happen is that the user can return a key tag and create an ambiguity in the key tag slot location 16. If no ambiguity exists, then the key drawer closing procedure is continued, as indicated in logic block 370.

Figure 4A:
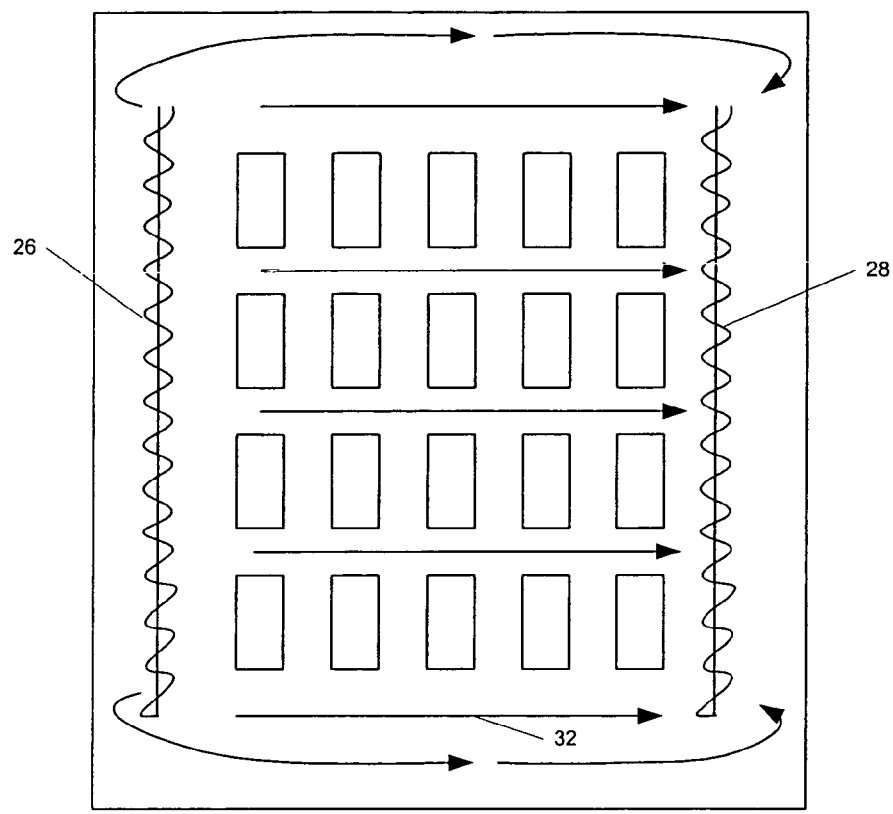
FIGS. 4A–4B illustrate the location of the RFID sensor coils within the key control system in accordance with an exemplary embodiment of the present invention.
Figure 4B:
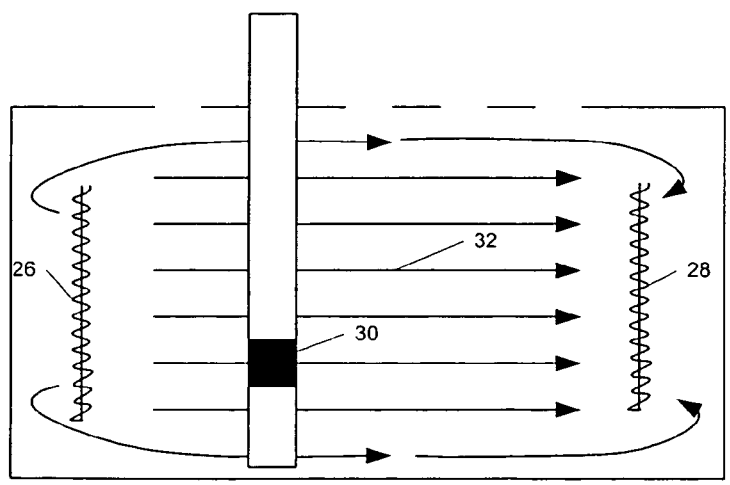

The location of the RFID sensor coils 26, 28 within the key control system is shown in FIGS. 4A–4B. FIG. 4A illustrates a top view of the shielded key control enclosure 12 also showing a plurality of slots 16; FIG. 4B illustrates an end view of the system. In the embodiment shown, two RFID sensor coils 26, 28 are placed near the left side and right side of shielded key control enclosure 12, respectively. The sensor near the left side is denoted as RFID coil A 26; the sensor near the right side is denoted as RFID coil B 28. These two RFID coils 26, 28 work in tandem to create a magnetic sensing field 32 between them, as indicated in both FIGS. 4A and 4B.

The key tags 14 are inserted through the key tag slots 16 as shown in the end view of FIG. 4B. The RFID tag 30 is contained on/in the portion of the key tag 14 inside the shielded enclosure 12. As shown in FIG. 4B, the RFID coil pair 26, 28 creates a magnetic field 32 that is normal to the surface of the key tag 14, yielding maximum induced current in the RFID tag 30.

The shielded enclosure 12 either is constructed of metal or is made conducting so that it acts as a shield. RFID tags 30 are interrogated at frequencies up to a few gigahertz (GHz). As long as the key tag slots 16 are electrically small, i.e., sized much less than the electromagnetic wavelength, then the magnetic field will be contained within the key control enclosure 12. The wavelength equals the speed of light divided by the frequency. At 1 GHz, the wavelength is approximately 1 foot. A typical key tag slot 16 is no longer than one inch. At lower frequencies, the wavelength increases and the key tag slot 16 is thus even more electrically small.

Containing the magnetic RFID interrogation field as described above is preferred because the presence detectors 22 and tag identification sensor work in tandem to know that key tags 14 are present and in which slot 16 they reside. If the magnetic interrogation field was not carefully confined, the potential then exists to pick up and read the ID code of tags outside, but nearby the key control enclosure 12. This would disrupt the logic processing outlined in FIG. 2 and result in key tags 14 being marked as ambiguous when the key control system is used with the presence of extra key tags nearby. However, while it is not preferred, it is possible to construct functionally useful key control systems that do not require the careful magnetic field confinement. These key control systems, while not technically superior, may be less costly to build and thus ultimately more deployable. In these key control systems, when extraneous key tags are being sensed by the magnetic interrogation field 32, several possibilities exist. One possibility is to reduce the current being driven into the RFID coils A 26 and B 28 until the extra key tags 14 are no longer being sensed. Another possibility is to solve the problem at a higher level. For example, the extraneous key tags being sensed may be contained in a neighboring key tag enclosure. The computer could compare the database of key tags in the neighboring enclosures to know that the extraneously detected key tags are already accounted for and thus were not just inserted into its slots.

Figure 5:
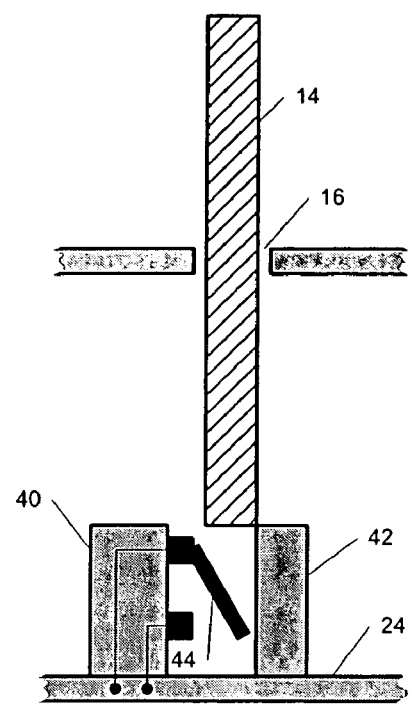
FIG. 5 illustrates the use of an electrical switch to detect the use of key tags in key tag slots in accordance with an exemplary embodiment of the present invention.

Several approaches for detecting the presence of key tags 14 in key tag slots 16 are described herein. Four such approaches are shown in FIGS. 5–8. A first approach is to utilize an electrical switch 40 as shown in FIG. 5. The switch 50 is placed on the backplane 24 in such a manner than when the key tag 14 is inserted through slot 16 in top tray 15, the bottom portion of the key tag 14 will close the lever 44 on the switch, thus electrically closing the switch. If the contact switch 40 is mounted vertically as shown in FIG. 5, then a tag alignment device 42 may be necessary to ensure that the inserted tag 14 properly engages/closes the switch 40. Note that mounting the switch vertically allows the switch to be closed for a range of insertion amounts.

Figure 6:
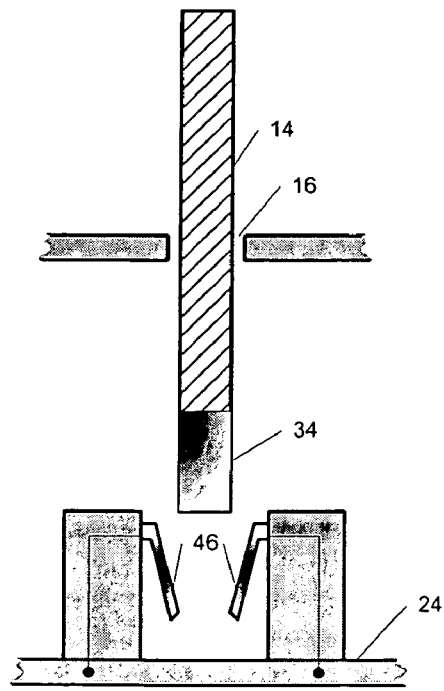
FIG. 6 illustrates an alternate embodiment of the use of an electrical switch to detect the presence of key tags in key tag slots.

A second approach that is related to the first is to simply make the end 34 of the key tag 14 metallic and place a pair of contacts 46 vertically on the backplane 24 as shown in FIG. 6. The insertion of the key tag 14 through slot 16 in top tray 15 will complete the circuit for a range of insertion amounts.

Figure 7:
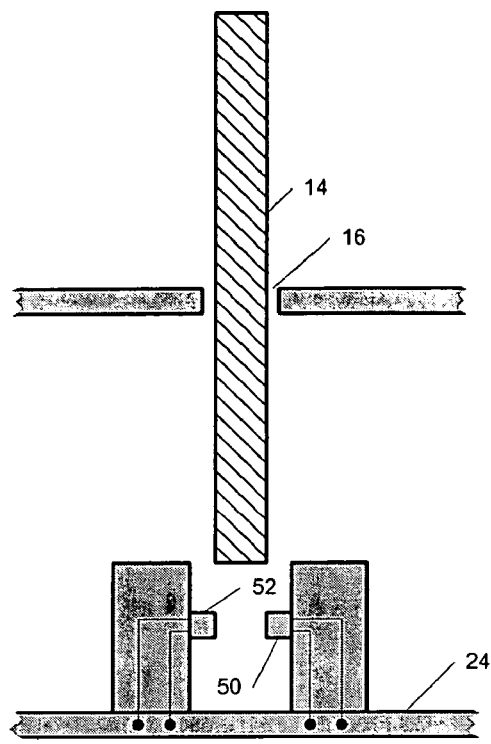
FIG. 7 illustrates the use of a photo-conducting switch to detect the presence of key tags in key tag slots in accordance with an exemplary embodiment of the present invention.

A third approach is to utilize a photo-conducting switch 50 as shown in FIG. 7. Photo conducting diodes and photo conducting transistors can be used as a photo-conducting switch. On one side of the key slot 16, an LED 52 is mounted and on the other side a photo-conducting switch 50 is mounted. If the key tag 14 is opaque, tag insertion through slot 16 in top tray 15 will block the light and open the switch 50. This switch operation state is opposite from the first two approaches, i.e., inserted tag yields open switch, instead of closed switch. The key control system can be designed to recognize either open or closed switches as a tag present or absent condition.

Figure 8:
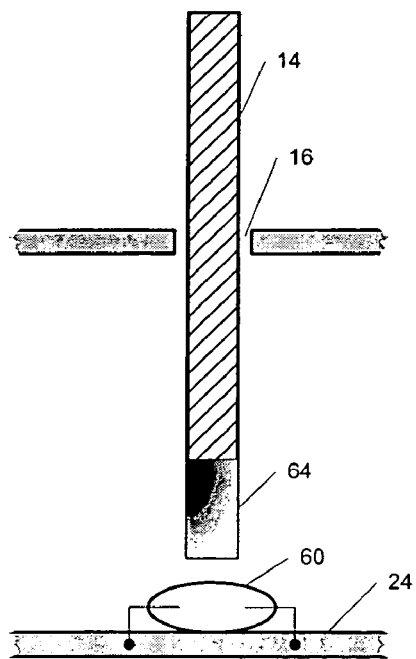
FIG. 8 illustrates the use of a magnetic reed switch to detect the presence of key tags in key tag slots in accordance with an exemplary embodiment of the present invention.

A fourth approach is to utilize a magnetic reed switch 60 as shown in FIG. 8. The reed switch 60 is placed on the backplane 24 below the key tag slot 16. The bottom portion 64 of the key tag 14 contains embedded magnetic material. When the magnetic material is close to the reed switch 60, the reed switch 60 closes. The range of operation is determined by the strength of the embedded magnetic material.

The switch or other sensor used for presence/absence detectors 22 can be configured in a matrix configuration. The circuit shown in FIG. 9 teaches the basic concept of encoding switches into a matrix. The circuit is improved by adding components to handle switch-bouncing effects. One of skill in the art can recognize that this is the basic concept of keyboard encoding and there are numerous circuit configurations to achieve switch encoding of a matrix. One of skill in the art can also configure similar matrix configurations to encode the other sensors mentioned. Two rows and columns of presence detectors 22 are depicted in FIG. 9 to simplify the schematic The presence detectors are labled A, B, C, D in the figure. Row selection line 23 leading from decoder 31 and column selection line 25 leading from multiplexer 33 are also illustrated. The presence or absence of a key tag 14 is indicated by SW STATE output 35 from multiplexer 33. The approach is scalable to multiple rows and columns.

As described above, proper key tag alignment is required for the presence detectors to operate. Several viable approaches for tag alignment are possible and are discussed below.

Figure 10A:
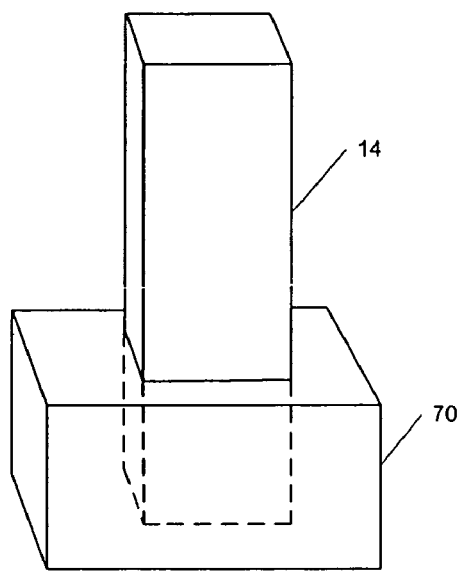
FIGS. 10A–10B illustrate in a perspective and an end view, the use of key tag receptacles on the backplane below each key tag for key tag alignment in accordance with an exemplary embodiment of the present invention.
Figure 10B:
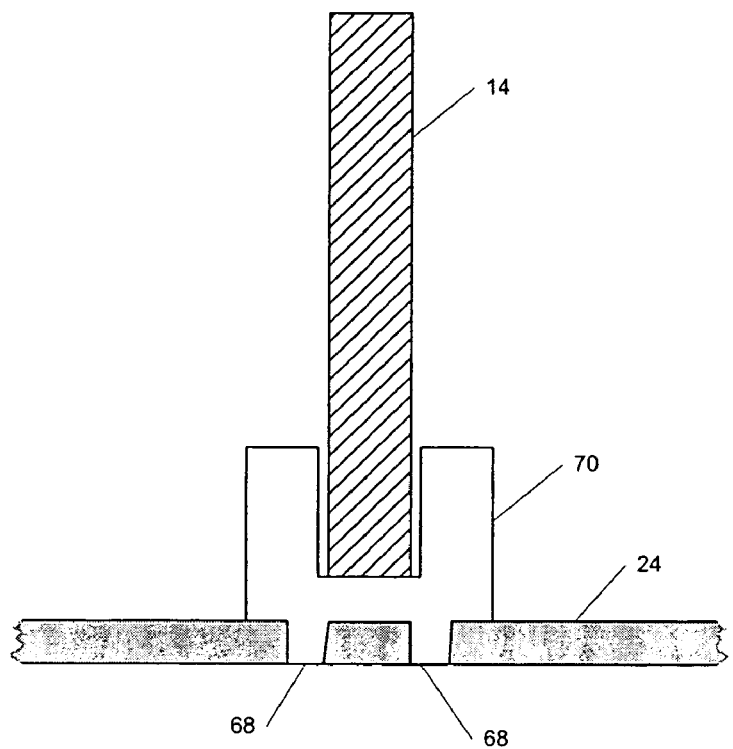

A first approach is to place key tag receptacles 70 onto the backplane 24 below each key tag slot 16, as illustrated in FIGS. 10A–10B. These receptacles 70 can be fabricated from plastic using injection molding. They can be fabricated in one piece per key tag slot 16 as shown in FIGS. 10A–10B or in one long piece with many receptacles per column of key tag slots (not illustrated). The location of attachments to the backplane 24 are indicated by reference numerals 68.

Figure 11A:
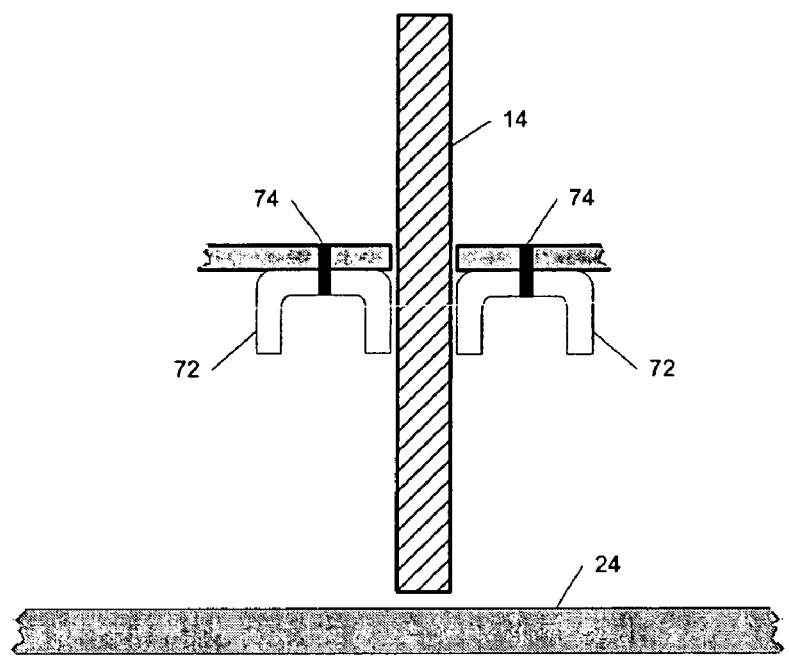
FIGS. 11A–11B illustrate the attachment of key tag alignment devices to the bottom or top of the top tray of the key drawer respectively, in accordance with an exemplary embodiment of the present invention.
Figure 11B:
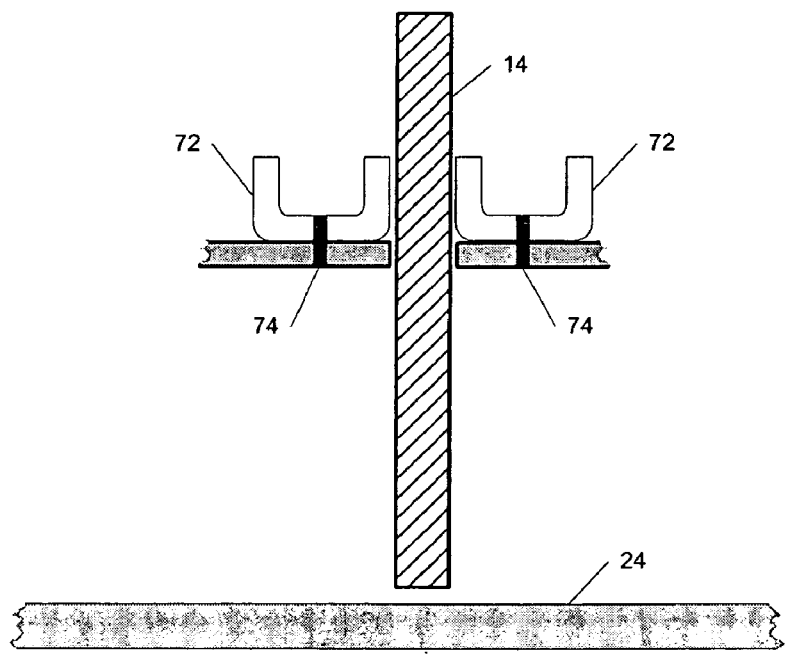

A second option is to construct alignment devices 72 that can be attached to the bottom or top of the top tray as shown in FIGS. 11A–11B. These alignment devices 72 can also be fabricated from plastic using injection molding. These parts would most likely be configured as long pieces for use on a column of key tag slots. The top tray attachment locations are indicated by reference numerals 74. Another option is to simply incorporate the alignment devices and the top inventory tray into a single, injection-molded part. This has the promise of simplifying construction and potentially reducing costs.

Further options include simply using multiple, vertically offset inventory trays to keep the key tags aligned when inserted. Additionally, a slot can be made in a backplane below each key tag slot to allow the key tag to pass through the backplane to ensure alignment. Using non-metallic materials such as plastic for these alignment devices causes no real problem for the magnetic RFID tag sensors.

Figure 12:
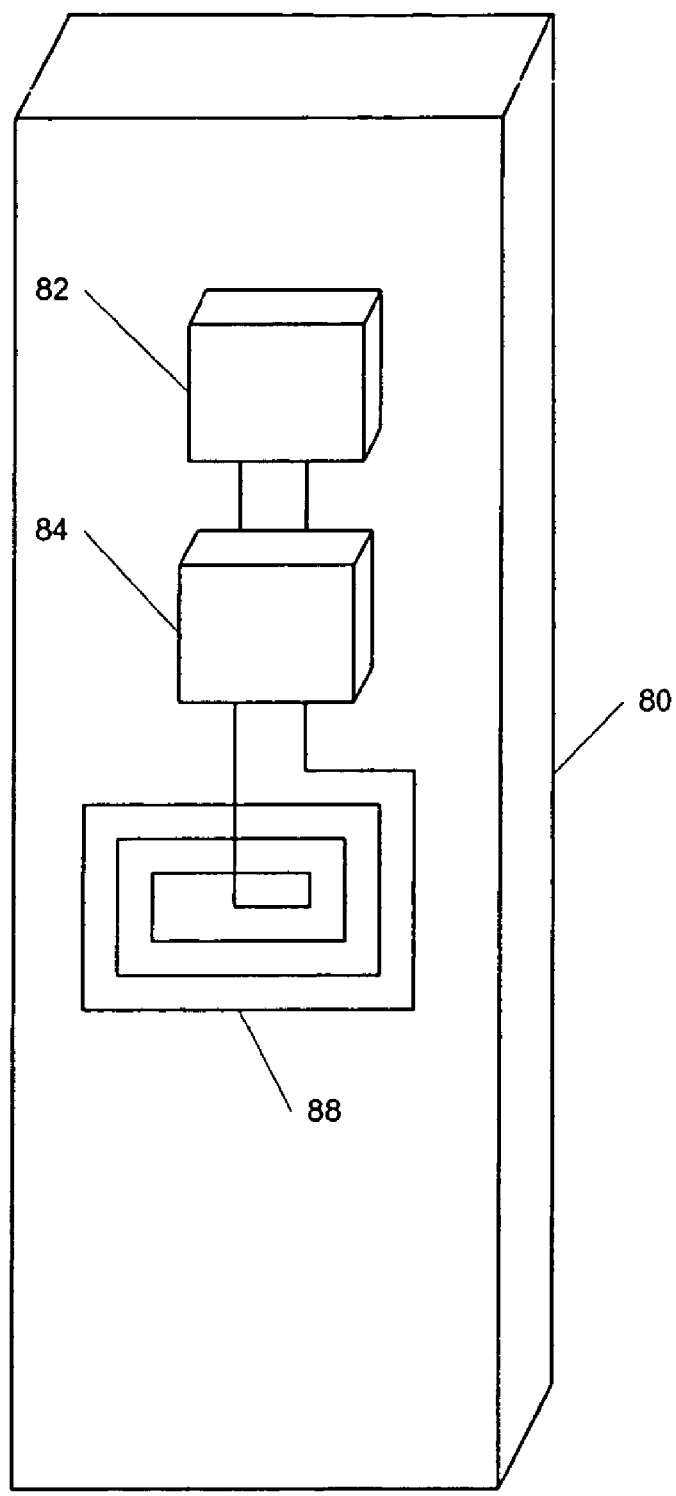
FIG. 12 illustrates the inclusion of a LED with an inductive RFID tag in accordance with an exemplary embodiment of the present invention.

One elegant way to overcome the ambiguity problem discussed above is to embed indicators into the key tag. FIG. 12 shows a key tag 80 that includes an LED circuit 82. The LED circuit 82 includes a power source and a current limiting device as is known in the art. This embodiment illustrates an inductive RFID tag coil 88 concept. The interrogating magnetic field powers and communicates with the RFID addressable switch 84. Using an RFID addressable switch 84 allows the interrogating field to selectively turn on the LED circuit 82 on the desired key tag 80. Other possible embedded indicators can include an audio buzzer and/or vibrating shaker. The ambiguity problem is overcome because in general the system does not need to know the location of each key tag 80. When the user wants to remove a specific key tag, the system can turn on the indicator 82, e.g., LED, on the desired key tag 80.

Figure 13:
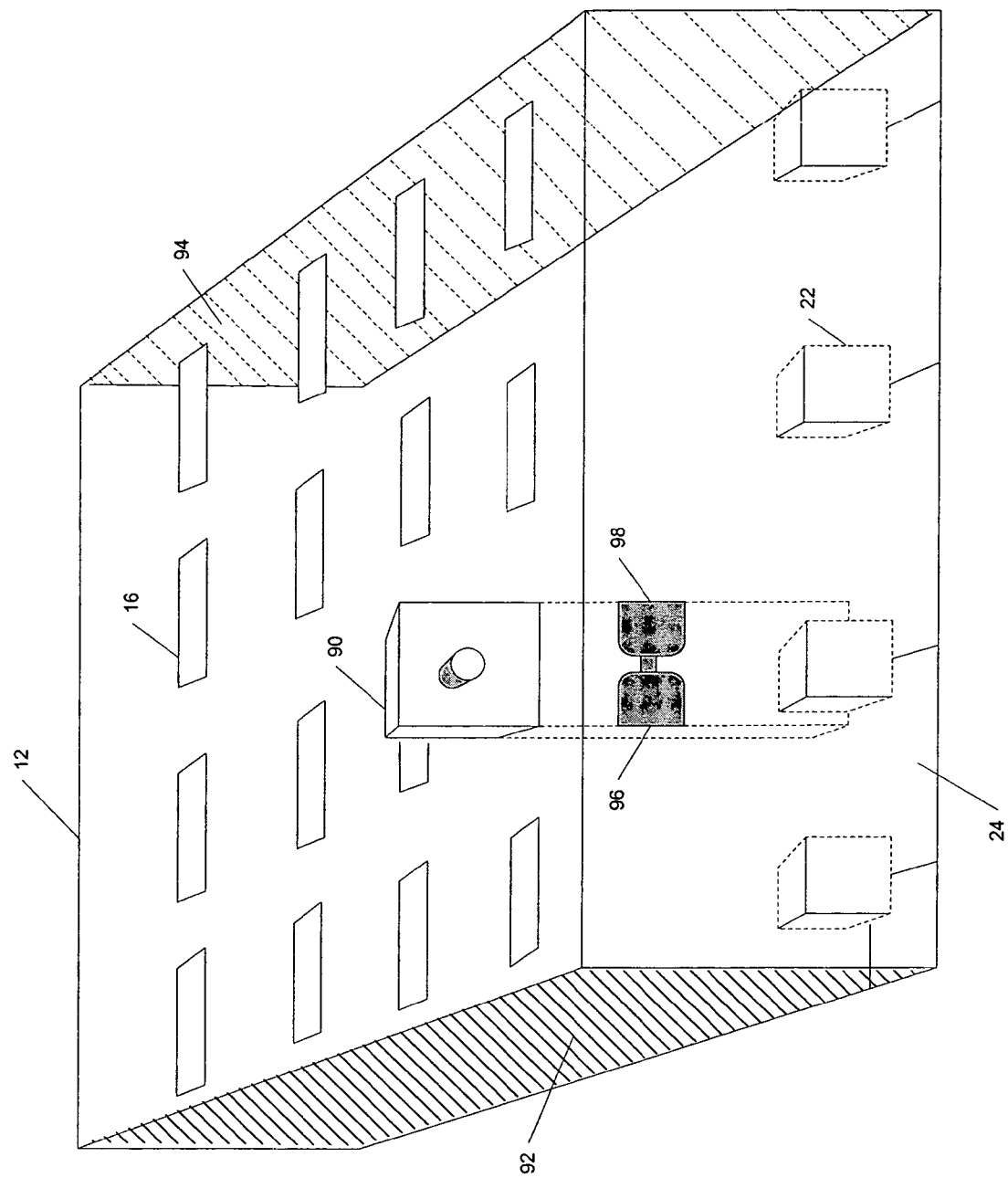
FIG. 13 illustrates a capacitive RFID tag in accordance with an exemplary embodiment of the present invention.

The majority of this description has been directed to the use of a magnetic RF interrogation field and inductive RFID tags. Embodiments that are based on capacitive RFID tags are also possible. One alternative embodiment is illustrated in FIG. 13. One criterion for alternative sensor approaches is read range, and the read range of capacitive tag RF tag sensors 92, 94 is sufficient to cover typical key tag enclosures 12. In a capacitive RFID tag embodiment, the RFID coils A 26 and B 28 are replaced by RFID capacitive plates 96, 98 and their location is moved to properly orient them with respect to the now capacitive RFID tags 90 on the key tags.

In general, the approach described herein uses one global sensor apparatus to interrogate all of the inserted key tags. While the single key tag sensor is the preferred embodiment, it may also be feasible to partition the enclosure into sub-enclosures. In that situation, one key tag sensor apparatus will then be used for each sub-enclosure.

The inventor's prior object tracking patents, U.S. Pat. Nos. 5,801,628 and 6,075,441, and RF key control system patent, U.S. Pat. No. 6,204,764, have described key control systems that utilize a one-wire memory device on key tags. The construction techniques are covered in these prior patents. The disclosures of each of these three prior patents are incorporated by reference herein in their entirety. The separated presence detection and identification mechanism described herein is also applicable to a one-wire memory device. Several approaches are possible. In a first approach, the one-wire memory device can be attached to a single, common bus on the backplane. This would allow all of the memory devices with unique IDs to be read serially. A matrix of presence detectors can also be placed on the backplane as described herein to determine which key tag slots contain key tags. Alternatively, multiple buses can be utilized. For example, there can be one bus per row or column, or perhaps one bus per zone of the backplane.

An additional reader on the outside of the key drawer is provided for an easy and straightforward method of entering tags into the key control system. Otherwise, the tags could be entered by entering a tag ID first, and then inserting the tag into the key control system for the system to assign the next RFID or button number to the entered tag ID. The tag ID in this case is an identifier that the user enters into the system to identify a particular tag. This reader can also be used for user access cards to log into the system.

An additional secure embodiment is to utilize assigned key tag slots. In this embodiment, the system of the key control system will not need presence detectors because location is assumed. If the user places the tag in the wrong slot, the system will still log the tag in as returned. If the user tries to take a key tag not requested, the key control system will still log it out to him because the global key tag scan notices its absence. Hence, the key control system is still secure, even though locations may be ambiguous. The aforementioned embedded indicator approach can be utilized to identify the requested key tag.

The invention described herein has used the term "key control enclosure" throughout. The preferred embodiment is for the key control enclosure to be a drawer. Other embodiments are vertically mounted cabinets, mobile carriers, or an open range embodiment. The objects being tracked have been described herein specifically as keys on key tags. Again, this is a preferred embodiment. However, various objects can be tracked using the approach described herein. For example, drugs, jewelry, portable bar code scanners, communication radios, etc. can use the teachings of this invention.

Those skilled in the art will appreciate that many modifications to the exemplary embodiments of the present invention are possible without departing from the spirit and scope of the present invention. In addition, it is possible to use some of the features of the present invention without the corresponding use of the other features. Accordingly, the foregoing description of the exemplary embodiments are provided for the purpose of illustrating principles of the present invention and not in limitation thereof, since the scope of the present invention is defined solely by the appended claims.

What is claimed is:

1. A method for tracking the replacement and removal of objects from a receptacle, said method comprising the steps of:
   conducting a scan of a plurality of slots in a receptacle to determine the presence of an object in the slot;
   conducting a scan of said receptacle to identify objects within the receptacle;
   comparing the results of the slot scan with the results from a previous slot scan; and
   comparing the results of the receptacle scan with the results from a previous receptacle scan.

2. The method of claim 1, wherein said slot scan is conducted independently of said receptacle scan.

3. The method of claim 2, wherein said slot scan is conducted using a first sensor and said receptacle scan is conducted using a separate second sensor.

4. The method of claim 1, further comprising the step of determining which slot has an object in it based on the step of comparing the results of the slot scan.

5. The method of claim 1, further comprising the step of identifying which objects have been removed from the receptacle based on the step of comparing the results of the receptacle scan.

6. The method of claim 1, further comprising the step of identifying which objects have been placed in the receptacle based on the step of comparing the results of the receptacle scan.

7. The method of claim 1, further comprising the step of determining the identity of an object that has been removed from the receptacle based on the step of comparing the results of the receptacle scan and the step of comparing the results of the slot scan.

8. The method of claim 1, further comprising the step of determining the identity and slot location of an object that has been placed in the receptacle based on the step of comparing the results of the receptacle scan and the step of comparing the results of the slot scan.

9. The method of claim 8, further comprising the step of logging the slot location of an object placed in the receptacle.

10. The method of claim 1, further comprising the step of determining the identity of a plurality of objects that have been placed in the receptacle based on the step of comparing the results of the receptacle scan.

11. The method of claim 10, further comprising the step of securing the receptacle to prevent access to objects stored therein.

12. The method of claim 11, further comprising the step of unlocking the secured receptacle based on the identity of the individual.

13. The method of claim 12, wherein the step of securing the receptacle occurs before the steps of conducting a scan is performed.

14. The method of claim 13, wherein the step of unlocking occurs after the steps of comparing results.

15. The method of claim 14, wherein the steps of scanning and comparing are performed each time the receptacle is secured.

16. The method of claim 11, wherein the step of conducting a scan is performed after the receptacle has been secured.

17. The method of claim 10, further comprising the step of logging the slot locations of the objects placed in the receptacle.

18. The method of claim 1, further comprising the step of granting access of an individual to objects within the receptacle.

19. The method of claim 18, further comprising the steps of
identifying an object removed by the individual; and
associating the removed object with the individual.

20. The method of claim 18, further comprising the step of
identifying an object placed in the receptacle by an individual; and
logging the identified object as being checked in by the individual.

21. The method of claim 1, further comprising the step of securing the receptacle to prevent access to objects stored therein.

22. The method of claim 21, wherein the step of conducting a scan is performed after the receptacle has been secured.

23. The method of claim 21, further comprising the steps of associating with an object certain information related to said object and unlocking the secured receptacle based on the information associated with the object.

24. The method of claim 21, further comprising the steps of associating with an object certain information related to said object.

25. The method of claim 24, further comprising the steps of receiving a request to unlock the receptacle and determining whether the receptacle should be unlocked based on comparing the request with the information associated with an object.

26. The method of claim 1, further comprising the step of securing objects in receptacle to prevent removal of objects from the slots.

27. The method of claim 1, wherein the step of scanning the receptacle is accomplished using a radio frequency sensor.

28. The method of claim 1, further comprising the step of associating with an object certain information related to said object.

29. A method for tracking the replacement and removal of key tags from a key storage unit, said method comprising the steps of:
securing the storage unit to prevent access to key tags stored therein;
conducting a scan of a plurality of slots in the storage unit to determine the presence of a key tag in the slot;
conducting a scan of said storage unit to identify key tags within the storage unit;
comparing the results of the slot scan with the results from a previous slot scan;
comparing the results of the storage unit scan with the results from a previous storage unit scan; and
determining the identity and slot location of a key tag within the storage unit based on the step of comparing the results of the storage unit scan and the step of comparing the results of the slot scan.

30. The method of claim 29, further comprising the steps of associating with a key tag certain information related to a key attached to said key tag.

31. The method of claim 30, further comprising the steps of receiving a request to unlock the storage unit and determining whether the storage unit should be unlocked based on comparing the request with the information associated with a key tag.

32. The method of claim 31, further comprising the steps of unlocking the storage unit and identifying a slot location of a key tag within the storage unit.

33. The method of claim 32, wherein the step of identifying is accomplished by activating an LED to identify a slot location.

34. The method of claim 29, wherein said slot scan is conducted independently of said storage unit scan.

35. A method for tracking the replacement and removal of key tags from a key storage unit, said method comprising the steps of:
securing a key tag in the storage unit to prevent removal of the key tag from the storage unit;
conducting a scan of a plurality of slots in the storage unit to determine the presence of a key tag in the slot;
conducting a scan of said storage unit to identify key tags within the storage unit;
comparing the results of the slot scan with the results from a previous slot scan; and
comparing the results of the storage unit scan with the results from a previous storage unit scan;
determining the identity and slot location of a key tag within the storage unit based on the step of comparing the results of the storage unit scan and the step of comparing the results of the slot scan.

36. The method of claim 35, further comprising the steps of associating with a key tag certain information related to a key attached to said key tag.

37. The method of claim 36, further comprising the steps of receiving a request to release a key tag and determining whether the key tag should be released based on comparing the request with the information associated with a key tag.

38. The method of claim 37, further comprising the steps identifying a slot location of a key tag within the storage unit and releasing the key tag.

39. The method of claim 38, wherein the step of identifying is accomplished by activating an LED to identify a slot location.

40. The method of claim 35, wherein said slot scan is conducted independently of said storage unit scan.

* * * * *